No. 875,248.
PATENTED DEC. 31, 1907.
J. DIERDORFF & W. W. WILLSON.
CONVEYER CHAIN.
APPLICATION FILED APR. 7, 1906.
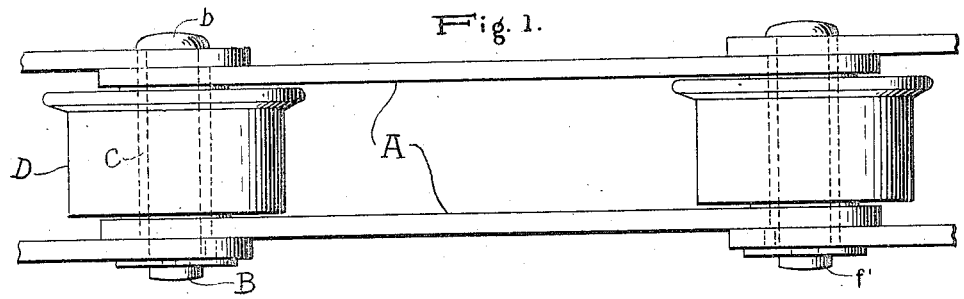
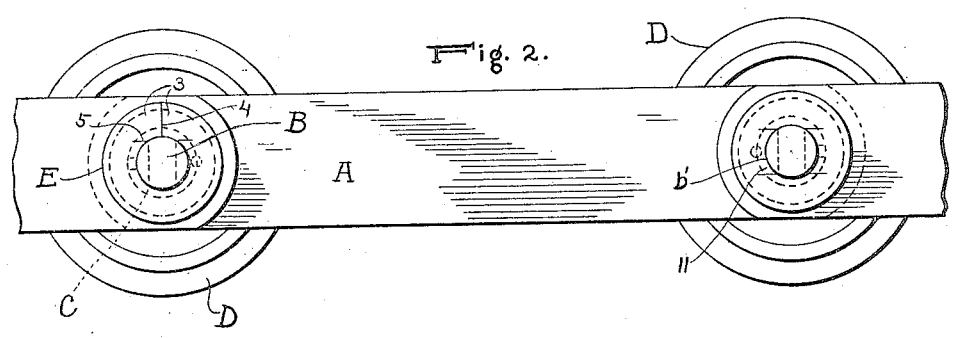
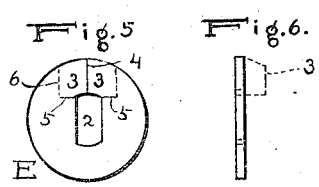 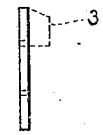 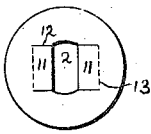
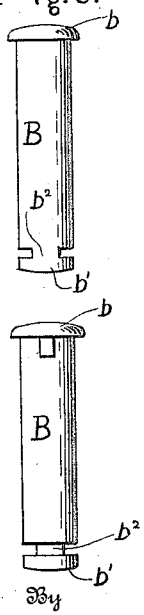
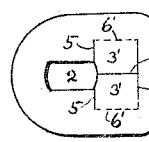 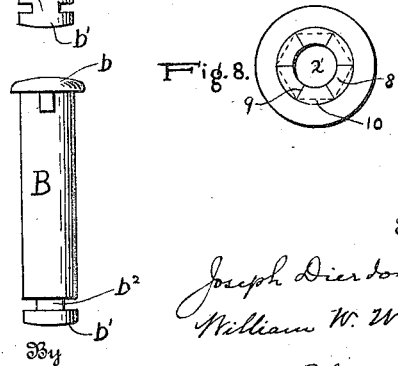
Witnesses
Stuart Hilder.
N. Curtis Lammonk
Inventors
Joseph Dierdorff and
William W. Willson
H. H. Bliss
Their Attorney
THE NORRIS PETERS CO., WASHINGTON, D. C.

UNITED STATES PATENT OFFICE.

JOSEPH DIERDORFF AND WILLIAM W. WILLSON, OF COLUMBUS, OHIO, ASSIGNORS, BY MESNE ASSIGNMENTS, TO THE JEFFREY MANUFACTURING COMPANY, A CORPORATION OF OHIO.

CONVEYER-CHAIN.

No. 875,248.     Specification of Letters Patent.     Patented Dec. 31, 1907.

Application filed April 7, 1906. Serial No. 310,509.

*To all whom it may concern:*

Be it known that we, JOSEPH DIERDORFF and WILLIAM W. WILLSON, citizens of the United States, residing at Columbus, in the county of Franklin and State of Ohio, have invented certain new and useful Improvements in Conveyer-Chains, of which the following is a specification, reference being had therein to the accompanying drawing.

In the use of drive and conveyer chains of the type wherein the links are formed of a series of independent side bars connected by pintles, which latter often serve as the supports or axles for wheels or rollers, much difficulty has been experienced in securing a satisfactory means for holding the pintles in place and preventing them from moving endwise in their seats.

Our invention has for its object to produce a locking means for the pintles of this type of chain.

Figure 1 is a plan view of a short section of a conveyer chain provided with our invention. Fig. 2 is a side or edge view of the parts represented in Fig. 1. Figs. 3 and 4 represent two different styles of pintles adapted to be used in connection with our improvements. Fig. 5 is a face view of one form of locking washer embodying our invention. Fig. 6 is an edge view of the same when ready to be put in place. Figs. 7, 8 and 9 are face views of other forms of the invention. Fig. 10 is an edge view of the locking washer shown in Fig. 9 when ready to be applied to a chain.

In the drawings A refers to the side bars of the chain, B the connecting pintles, C wearing sleeves or bushings mounted upon the pintles, and D wheels or rollers arranged between the side bars at the joints of the chain, and supported upon the wearing sleeves, these parts being of any usual or well known construction. Each pintle is preferably formed with an enlarged head $b$ at one end, and is of a length to extend entirely across the chain so that when its head is in engagement with the outer face of a side bar on one side of the chain, its opposite end projects a little beyond the outer face of the bar at the other side. The pintle, near the end opposite the head $b$, is formed with a neck or stem $b^2$ of reduced size, which may be produced by slotting or cutting away the pintle on opposite sides, as represented in Fig. 3, or by means of a circumferential groove as represented in Fig. 4.

The means which we have invented for preventing endwise movements of the pintles in their seats consists of washers or plates of relatively thin metal, one of these being used in connection with each pintle.

We have shown several forms of locking washers which while differing in detail have many features in common.

Referring to the form of our invention illustrated in detail in Figs. 5 and 6, and at the left hand ends of Figs. 1 and 2, E designates the locking washer or plate considered as a whole. It is preferably of circular outline and is provided with a centrally disposed aperture 2, the opposite side edges of which are preferably parallel and arranged at a distance apart substantially equal to the diameter of the neck $b^2$ of the pintle. When the locking washer is in place the neck of the pintle occupies this aperture, the washer being confined between the side bar A and the head $b'$ of the pintle just outside the neck $b^2$. In order to permit the washer to be applied to the neck of the pintle, behind the head $b'$, we construct it so that it shall have two bendable wings 3, 3, arranged adjacent to the central aperture 2, and adapted when bent out of the common plane of the washer to open or give access to the aperture, and when bent into the plane of the washer to close the aperture. These wings are formed by a slit 4 extending from one end of the aperture 2 to the periphery of the washer and other slits 5, 5, extending from the edges of the aperture, at the end from which the slits 4 extends, in opposite directions toward but not quite to the edge of the washer. The directions of the slits 4 and 5 are preferably at right angles to each other. The wings 3, formed by cutting or splitting the washer as described, may be bent outward, along the dotted lines 6, Fig. 5, thus producing an opening from the outside into the aperture 2 of a size sufficient to permit the washer to be slipped over the exposed end of the pintle, and the neck $b^2$ seated in the aperture. Then by forcing down the wings into the common plane of the washer and against the face of the side bar, the aperture is closed so that the washer cannot be accidentally removed, while it, in turn, holds the pintle in place and against longitudinal movement. The form of washer we have just described is particularly adapted for use in connection with a pintle such as illustrated in Fig. 3, although it could of course be employed in connection with one in which the neck is formed by means of a circumferential groove as in Fig. 4.

The form of locking washer represented in Fig. 7 is quite similar to that represented in Fig. 5 and just described, but differs in that the slit, 4', extending from the end of the aperture does not reach quite to the edge of the plate, but instead joins a slit 7 at right angles thereto and parallel with the slits 5. In this case the wings 3' are formed by bending along the dotted lines 6', 6'. The washer just described is applied in a manner similar to the one shown in Fig. 5 and acts in a similar manner. In both forms of our invention thus far described the apertures 2 have been approximately oblong in shape, conforming to the cross-sectional shape of the neck of a pintle formed as shown in Fig. 3.

In Fig. 8 we show a form of locking washer adapted to be used in connection with a pintle the neck $b^2$ of which is of cylindrical shape. In this washer the pintle aperture 2' is circular in outline and is surrounded by a set of bendable wings 8 formed by a set of slits 9 radiating from the aperture. These wings may be bent along the dotted lines 10 so as to stand up or out from the face of the washer with the result that the pintle aperture is enlarged sufficiently to permit the washer to be passed over the exposed end of the pintle. When in place against the face of the side bar A the wings may be forced back into position, by a hammer or other suitable tool, when their inner ends will take under the head $b'$ and so secure the washer in place.

The form of our invention illustrated in Figs. 9 and 10 approaches more nearly the forms shown in Figs. 5 and 7 than it does that in Fig. 8, although in some respects it resembles the latter. The wings 11 are opposite the straight sides of the aperture 2 and are formed by slitting the washer at 12 and bending along the dotted lines 13. The manner of applying and securing the washer in place is similar to that described in connection with the form shown in Fig. 8, the wings 11 being forced down under the head $b'$ after the washer has been placed over the end of the pintle and against the side bar. It is sometimes found desirable to transversely curve or bend the entire washer as represented in Fig. 10 to facilitate its application to the chain, it being flattened out by pressure applied to a suitable tool when put upon the pintle.

It will be observed that in both forms of the invention illustrated in Figs. 8 and 9 when the wings are bent out of the plane of the washer as a whole they are also bent away from the center of the aperture, in that way enlarging the latter; and that when the wings are forced down into the plane of the washer, the latter being in place upon a pintle, the ends of the wings are forced to enter the neck behind the head $b'$.

What we claim is:—

1. The combination with a chain having side bars and connecting pintles, the exposed ends of the pintles being formed with reduced necks, of securing washers, each slotted to engage with the neck of a pintle to prevent endwise movement thereof, and provided with bendable parts lying alongside of the slot and arranged to be forced into the neck of a pintle to prevent the disengagement of the washer from the pintle by transverse movements of the former, substantially as set forth.

2. The combination with a chain having side bars and connecting pintles, the exposed ends of the pintle being formed with reduced necks, of securing washers each formed with a central aperture adapting it to engage with the neck of a pintle and prevent endwise movement thereof and having bendable wings adjacent to the aperture arranged when bent out of the plane of the washer to open or enlarge the aperture to permit the washer to be applied to the pintle and when bent into the plane of the washer to contract the aperture and enter the said neck of the pintle to secure the washer in place, substantially as set forth.

3. The combination with a chain having side bars and connecting pintles, the exposed ends of the pintles being formed with reduced necks, $b^2$, and heads $b'$, of securing washers for preventing endwise movements of the pintles, each formed with a central aperture and with bendable wings arranged to be bent out of the plane of the washer as a whole and away from the center of the aperture, whereby the latter is enlarged, the ends of the wings being adapted to enter the neck of the pintle behind the head $b'$ when they are forced down into the plane of the washer substantially as set forth.

4. The combination with a chain having side bars and connecting pintles, the exposed ends of the pintles being formed with reduced necks $b^2$ and heads $b'$, of securing washers for preventing endwise movements of the pintles each formed with a central aperture having opposite straight edges, and with bendable wings arranged between one end of the aperture and the periphery of the washer, substantially as set forth.

In testimony whereof we affix our signatures, in presence of two witnesses.

JOSEPH DIERDORFF.
WILLIAM W. WILLSON.

Witnesses:
F. R. WILLSON, Jr.,
CHAS. M. SNIDER.